United States Patent
Le Cunff

(10) Patent No.: US 6,553,325 B1
(45) Date of Patent: Apr. 22, 2003

(54) METHOD FOR DIMENSIONING AN ELASTIC STRUCTURE SUBJECTED TO A FLUID IN MOTION

(75) Inventor: Cédric Le Cunff, Paris (FR)

(73) Assignee: Institute Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 09/516,164

(22) Filed: Feb. 29, 2000

(30) Foreign Application Priority Data

Mar. 5, 1999 (FR) .............................................. 99 03045

(51) Int. Cl.⁷ .......................... G01N 11/00; G01F 17/00
(52) U.S. Cl. ......................... 702/56; 702/155; 702/156; 73/54.13; 73/54.14
(58) Field of Search .............................. 702/33, 41, 42, 702/44–46, 50, 55–56, 100, 104, 155–156; 73/1.79, 1.81, 1.82, 54.13, 54.14, 54.32, 570, 575

(56) References Cited

U.S. PATENT DOCUMENTS

| | | | |
|---|---|---|---|
| 4,181,029 A | * 1/1980 | Talbott, Jr. .................... | 702/56 |
| 4,543,014 A | * 9/1985 | Brandi et al. ................ | 405/207 |
| 4,733,630 A | * 3/1988 | Sugimoto et al. ........... | 118/109 |
| 5,317,908 A | * 6/1994 | Fitzgerald et al. ......... | 73/54.26 |

OTHER PUBLICATIONS

"TLP Riser Analysis" by Young & Fowler, appearing in Tension Leg Platform. A State of the Art Review, 1989, pp. 118–138, XP000870029, New York, NY, USA.

"Effects of Appendages and Small Currents on the Hydrodynamic Heave Damping of TLP Columns" by Thiagarajan and Troesch, appearing in Journal of Offshore Mechanics and Arctic Engineering, Feb. 1998, vol. 120, pp. 37–42, XP000869821, Fairfield, NJ, USA.

"Prediction of Dyanmic Response of TLP Tethers to Vortex Shedding Under Circumstances of Platform Oscillation", by Ling & Wang, appearing in the Proceedings of the Sixth (1996) International Offshore and Polar Engineering Conference, vol. I, (May 26–31, 1996, pp. 234–239, XP000869953, Los Angeles, Calif., USA.

"Hydrodynamic Damping Estimation and Scaling for Tension Leg Platforms", by Thiagarajan and Troesch, appearing in Proceedings of the 12$^{th}$ International Conference on Offshore Mechanics and Arctic Engineering, vol. I, Jun. 20–24, 1993, pp. 473–479, XP000869819, Glasgow, Scotland, UK.

* cited by examiner

Primary Examiner—Bryan Bui
(74) Attorney, Agent, or Firm—Antonelli, Terry, Stout & Kraus, LLP

(57) ABSTRACT

The invention is a method for dimensioning or adapting an elastic structure immersed in a fluid in motion, the structure having a length Lt. The method comprises: a) the natural excitation modes of the structure and their number N are defined; b) for at least a given time t for an excitation mode of the structure, the various holding zones $L_R$ over length Lt and, for each holding zone, the excitation force $F_R$ corresponding to the excited natural mode r are determined; c) step b) is carried out for all the natural modes defined in step a); and d) the vibration amplitude response A of the elastic structure over part of length Lt is determined.

21 Claims, 1 Drawing Sheet

METHOD FOR DIMENSIONING AN ELASTIC STRUCTURE SUBJECTED TO A FLUID IN MOTION

BACKGROUND OF THE INVENTION

1. Field of the Invention

The present invention relates to a method for modelling the effects of the vibrations induced by a vortex on or in an elastic structure subjected to a fluid in motion.

2. Description of the Prior Art

The presence of an elastic structure in a fluid in motion and having a variable velocity in time and in space can produce instability in this fluid. The fluid creates vortices as it comes off the structure. The swirling alternating separation thus created can lead to vibrations of the structure referred to in shortened form as VIV (vortex-induced vibrations) in the description hereafter. These VIV can have a great effect, notably on the fatigue strength of the structure.

The fatigue strength or resistance of a riser or of a pipe providing effluent transfer is a major problem for oilfield development. In particular, in the case of great water depths, these pipes are subjected to stresses and vibrations that can reduce the life thereof and cause damage that can lead to breakage. Anticipating the behavior of these risers with time notably allows reduction of the maintenance costs and avoiding risks of pollution due to a possible breakage.

The term excitation designates in the description hereafter the propagation of the vibration along the structure, its damping and its natural modes. The thrust corresponds to the force exerted by the vortices on the elastic structure. The drag force corresponds to the force exerted by the current on the structure.

It is well-known to determine the response of an elastic structure subjected to external disturbances.

One of the methods implemented is described by Vandiver and Li in the instruction manual (1995) of the software marketed under the name SHEAR7. This software uses values of natural modes of the structure calculated by means of the software itself or by means of another computing software. The software then defines the thrust forces and the hydrodynamic damping for each mode, in order to obtain the amplitude response of the vibrations, as well as the life of the riser. The method is a modal approach that only takes into account the frequency variation of the vibrations, the current or external excitation being considered to be a constant in time. The variation of the disturbance is monotonic in space. The author uses a corrective coefficient to account for the correlation between the various forces.

Another procedure disclosed by Nedergaard consists in getting close to the "lock-in" mode where the resonant frequency of the structure is close to the Strouhal frequency known to those skilled in the art. The authors account for the variation of the disturbance with space and time in order to obtain the response of the structure. However, they do not consider the influence of the various forces acting on the various natural modes of the structure.

SUMMARY OF THE INVENTION

Although taking account of the interactions between the various parameters and the various forces involved in the vibrational phenomena induced in a structure is complex, the method according to the invention allows evaluation of the response of an elastic structure subjected to a fluid in motion by taking into account the interactions of the various forces on all the natural modes of vibration.

An elastic structure is understood to be a structure wherein the vibrations can be propagated over all of its length or at least the most part of this length.

The invention is particularly well-suited for dimensioning or adaptation of a structure having a one-dimensional type dominant length.

The invention relates to a method for dimensioning or adapting an elastic structure immersed in a fluid in motion, the structure having a length Lt.

The method comprises:

a) defining the natural excitation modes of said structure and their number N are defined, b) for at least a given time for an excitation mode of the structure, the various holding zones $L_R$ over length Lt and, for each holding zone, the excitation force $F_R$ corresponding to the excited natural mode r are determined, c) step b) is carried out for all the natural modes defined in step a), d) the vibration amplitude response A of the elastic structure over the greatest part of its length Lt is determined by taking into account the effect of the various excitation forces $F_R$ on each natural vibration mode defined in step a) so as to obtain a characteristic allowing dimensioning or adapting the structure to the mechanical stresses applied by the fluid in motion.

According to an embodiment, steps a) to d) are repeated for a given time interval tmax.

According to another embodiment, the value of vibration amplitude Ai for an excitation mode i and a time (t−dt) is for example compared with the vibration amplitude values |Ai(t)| and |Ai(t−2dt)| respectively obtained at times (t) and (t−dt), and when value |Ai(t−dt)| is greater than these two values, it is used in steps a) to d).

According to an embodiment, the vibration amplitude is determined for a point z of the structure by splitting it up, for example, on the basis of the natural excitation modes i as follows:

$$A(z) = \sum_{i=1}^{N} A_i Y_i(z)$$

Ai modal amplitude being split up for a given time t on the basis of all of the excitation forces according to the relation:

$$A_i = \sum_{r=1}^{N} A_{ir} \exp(j\omega_r t)$$

with $A_{ir}$ the vibration amplitude for a mode i and a force corresponding to subscript r.

According to an embodiment for calculating the vibration amplitude for a mode i and a force r, the history Γ(t) of the force at the time t is used, the history being obtained by linear combination of the history of the force at the time (t−dt) multiplied by a coefficient and the history of the force obtained on the increment dt.

According to an embodiment, the vibration amplitude $A_{ir}$ can be calculated by splitting up the pulsation on the mode i and the force corresponding to the subscript r being considered.

The drag coefficient of the structure is for example determined.

According to another variant, at least one maximum stress value corresponding to a point z of the structure is for example determined at a given time tmax.

The fatigue value of the structure can also be determined.

The method according to the invention is for example applied for dimensioning or adapting a pipe used in oil production to the mechanical stresses applied by the wave motion or the sea currents.

According to an implementation variant of the method, the drag coefficient of the pipe and/or the stresses induced in the pipe and/or the fatigue of the pipe are determined for a pipe used in the sphere of oil production.

BRIEF DESCRIPTION OF THE DRAWINGS

Other features and advantages of the method and of the device according to the invention will be clear from reading the description hereafter of embodiments given by way of non limitative examples, with reference to the accompanying drawings wherein.

DETAILED DESCRIPTION OF THE INVENTION

An elastic structure, such as a cylindrical pipe having a dominant length, is immersed in a fluid 5 in motion and is subjected to induced vibrations. The fluid behind the structure is unstable, the fluid particles split off therefrom and create vortices 6 known as Karman vortex street, which have a characteristic frequency. When the structure is elastic, the vortices of the fluid can excite one or more natural modes of this elastic structure. In this case, the frequency of the vortices is imposed by the excited mode.

Figure 1:
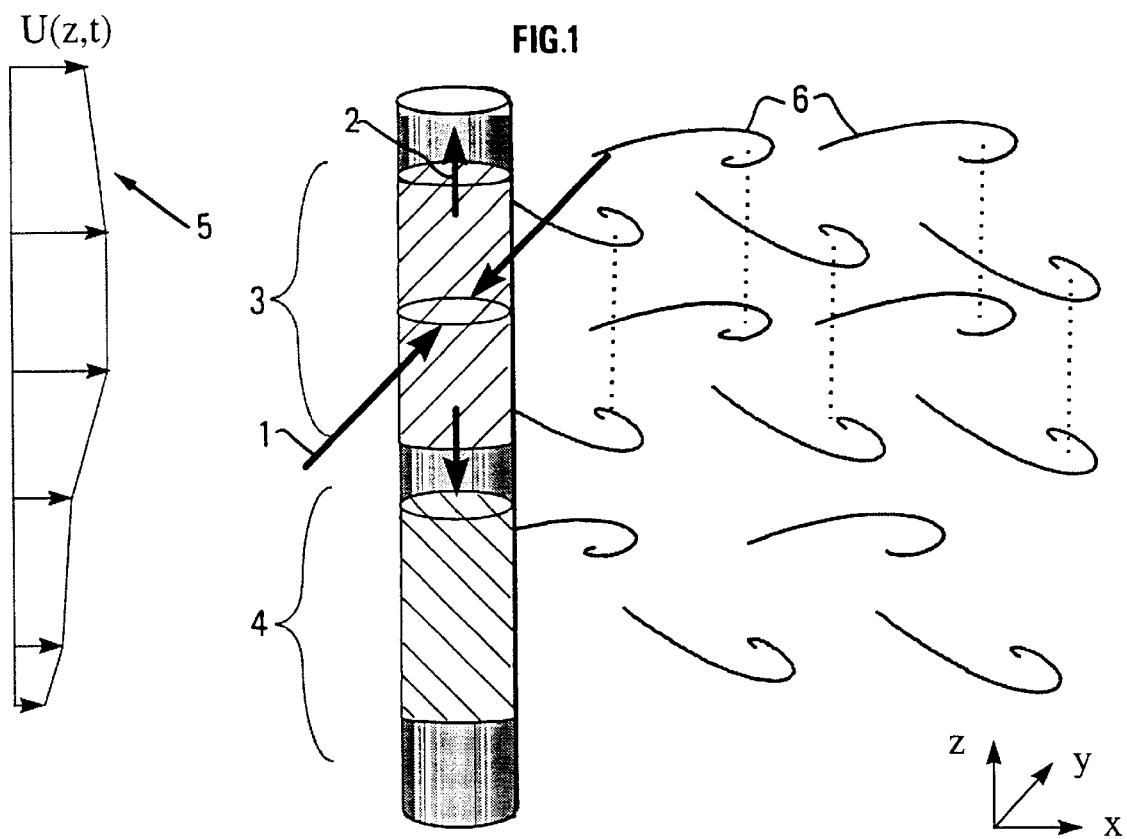
FIG. 1 diagrammatically shows the vortices induced by an elastic structure.

FIG. 1 shows, by means of arrow 1, the thrust force at an excitation frequency fj and, by arrow 2, the hydrodynamic damping of the excited mode j. Various lock-in zones 3 and 4 are for example defined on two different excited modes i and j, also designated by the expressions "holding zone" or "excitation zone", determined according to the method given hereafter.

The amplitude of the vibrations induced in the structure notably allows knowing the maximum stress zones, the maximum fatigue areas of the structure, to deduce its life therefrom or the areas for which anti-vibration means are useful. It is also possible to determine the change in the drag coefficient in the flow.

As mentioned above, the method according to the invention comprises determining the amplitudes of vibrations induced in a structure by taking into account the disturbance variation in space and in time, and the interactions of a force on a vibration mode and of all of these forces on all the vibration modes.

During a preliminary stage, various parameters natural to the elastic structure studied and parameters involved in the steps of the method are determined.

Determination of the natural modes is performed by taking into account the way the structure is fastened, its degrees of freedom, characteristic structural data, by using for example the Deeplines software developed and marketed by the Assignee.

Natural Vibration Modes of the Elastic Structure, in Order to Obtain, for a Given Vibration Mode i:
the vibration frequency fi,
the elastic line of the structure Yi,
the curvatures of the structure, The Number N of Natural Vibration Modes of the Structure.

To obtain the value of N, the maximum excited frequency value or the maximum velocity of the current or of the disturbance to which the structure is subjected is considered, The values of the excitation forces that are imposed by the external disturbance to which the structure is subjected. The external disturbance to which the structure is subjected is given as a function of time and of space. For example, in the case of a current or of a fluid in motion, the velocity of flow U(t,z), with t the time variable and z the space variable, is considered.

The Increment dt for the Time Variable t.

To obtain increment dt, the shortest natural period Tmin of the structure excited by current U(t,z) is for example determined and this natural period may be divided by a coefficient Ct so as to obtain the value of increment dt. The dividing coefficient Ct is for example selected according to the resolution required by the user (it is possible to divide by 10).

Spatial Representation of the Structure.

The elastic structure is for example represented by splitting the structure up into several zones of length dz. Length dz is determined by considering the shortest wavelength λmin of the excited natural modes and by dividing λmin by a coefficient Cl so as to obtain dz.

Parameters and Data at the End of the Preliminary Step

A the end of the preliminary step,
the natural modes i of vibration and their number N,
the time increment value dt,
the mesh pattern value dz of the structure are known.

The representation in time and space of current U(t,z) is for example obtained from initial tables obtained by means of current behavior predictions.

A time value tmax is set, which is representative of the behavior of the elastic structure in time under the effect of the exterior disturbance, and for which the maximum or extreme values of the effect of the induced vibrations are sought.

For t=0, the vibration amplitude value Ai and the maximum value At are, for example, initialized at zero.

Calculation Steps of the Maximum Vibration Amplitude of the Structure for a Given Time t Step 1:

The various holding zones are determined over the total length Lt of the structure at the time t. A holding zone or excitation zone is defined as a length for which the various forces are correlated.

The velocity U(z) of the current is known for the time t. In the case of a flexible pipe fastened at both ends, point z is for example located in relation to one of the two points.

The value of the frequency fs(z) of the vortices of the fluid in motion around the elastic pipe is determined for a point z as follows:

The value of the Reynolds number Re defined by:

$$Re(z)=U(z)d(z)/v$$

where d is the diameter or the section of the structure that can vary as a function of z, and v the kinematic viscosity of the fluid in which the elastic pipe is immersed, is calculated.

A value for the Strouhal number S equal to fs*d/U(z) is associated with the Reynolds number Re(z) obtained. This number S is taken equal to:

0.2 if $Re<10^5$, 0.3 if $Re>10^6$, or it is calculated by linear interpolation if $10^5>Re>10^6$.

The value of the frequency $$f_s(z)=(S)*(U(z)/d)$$

is determined, for a point z of the structure, from the Strouhal number S.

All the frequency values are determined for all the points z, for example by incrementing the initial value z by mesh pattern value dz.

FOREIGN PATENT DOCUMENTS

At the end of this step, and for the initially selected time t, values (fs(z),z) are set.

FOREIGN PATENT DOCUMENTS

An interval is defined around each frequency value fs(z), for example fs(z)+/−x% with x=10.

FOREIGN PATENT DOCUMENTS

The excited natural mode r is sought at a point z by checking that the natural frequency $f_R$ thereof varies within the range fs(z)+/−10%.

FOREIGN PATENT DOCUMENTS

In cases where several modes r are excited, the mode r whose frequency $f_R$ is the closest to fs is selected.

FOREIGN PATENT DOCUMENTS

The various holding zones corresponding to the holding lengths $L_R$ are determined from these values as all of the points z of the structure excited by mode r.

FOREIGN PATENT DOCUMENTS

The elastic structure is thus divided in several holding zones having each a length $L_R$.

FOREIGN PATENT DOCUMENTS

In a second step, the thrust forces and the damping of the structure at the time t are calculated.

FOREIGN PATENT DOCUMENTS

Step 2:
Calculation of the Thrust Forces (1)

The excitation force is in the plane perpendicular to the flow of the fluid in motion and to the structure. The frequency of the excitation force is that of the excited mode r and its amplitude $F_R$ is given for a frequency and for a natural $$F_{R_\omega} = C_c(r)\frac{1}{2}\rho d C_L(r)(U(z))^2$$

excitation mode r by:
  with d being the section of the elastic structure or the diameter in case of a cylindrical pipe, which can depend on point z,
  ρ being the value of the density of the fluid in which the structure is immersed,
  U(z) being the value of the current for a point z at the time t,
  $C_c$ being the reduction coefficient depending on the vibration mode,
  and $C_L$ being the thrust coefficient, which are determined for a given mode r as explained hereafter.

Determination of the Reduction Coefficient $C_c$ (r):

Coefficient $C_c$ (r) is a reduction coefficient that accounts for the fact that, on a holding zone, the forces are not perfectly in phase. Correlation length $l_c$ represents an average length of the elastic structure on which the forces are in phase.

The value of the correlation length for a given mode i can be determined by means of known formulas, for example by using the formula experimentally obtained by Ottesen Hansen, published in "Vibrations in pipe arrays in wave", Proceedings of BOSS'82, pp. 641–650, 1983.

From these experiments, the correlation length is:

$$l_c(r) = 3d + 35d\frac{A_t(r)/d}{0.5 - A_t(r)/d} \text{ if } A_t(i)/d < 0.5$$

where $l_c = \infty$ for the other values of this fraction.

$A_t$ (r) is the last maximum amplitude obtained in the previous time interval (t−dt), or equal to a value initially set for the first time interval, it is for example taken equal to 0.

For the holding zone having a length $L_R$ defined by all of the points obtained during stage 1 and for a vibration mode i, the reduction coefficient is given for a given mode i by the following formula:

$$C_c(r) = \frac{l_c(r)}{L_R}\left(1 - \frac{l_c(r)}{2L_R}\left(1 - \exp\frac{-2L_R}{l_c(r)}\right)\right)$$

Determination of the Thrust Coefficient $C_L$ (r):

The thrust coefficient is given by interpolation on a curve $C_f(r)(A_t(r)/d)$ between two extreme points.

The two points between which interpolation is performed are determined by means of experimental data obtained for example according to the method described by King in "A review of vortex shedding research and its application", Ocean Engineering, Vol.4, pp. 141–171, 1977.

| $A_t/d$ | 0.0 | 0.3 | 0.7 | 1.5 |
|---|---|---|---|---|
| $C_L$ | 0.2 | 0.6 | 0.6 | 0.0 |

This interpolation is valid for Re greater than 1000.

With Re ranging between 50 and 1000, the thrust coefficient is multiplied by an interpolated correction whose value is 0 for Re<50 and 1 for Re=1000.

For each value z of the structure and for each holding zone, at the time t considered, a force $F_R$ (z) that notably depends on vibration mode r is calculated.

For the structure, a set of values consisting of pairs ($L_R$ (z), $F_R$ (z)) is set.

Calculation of Vibration Damping Along the Elastic Structure (2)

Damping comprises a hydrodynamic damping term and a structural damping term.

Structural damping term ε s is given by the user and notably depends on the characteristics of the elastic structure. It is in most cases negligible in relation to the hydrodynamic damping term, and it is disregarded for calculation.

The hydrodynamic damping term is calculated from coefficients given by Venugopta in "Damping and response prediction of a flexible cylinder in a current", MIT, 1996.

If the current velocity U(z) considered at the time t is lower than the velocity exciting mode r, the formula of the hydrodynamic damping is:

$$\varepsilon_h(i) = 0.2 \times \rho dU(z) + \frac{\omega_r \pi \rho d^2}{2}\left[\frac{2\sqrt{2}}{\sqrt{\omega_r d^2/\nu}} + 0.2\left(\frac{A_t(r)}{d}\right)^2\right]$$

and if the velocity is higher:

$$\varepsilon_h(i) = 0.2 \times \frac{\rho(U(z))^2}{\omega_r}$$

where ρ is the density of the fluid.

The damping value of the structure is thus known for an excited natural mode r, which is the sum of the calculated hydrodynamic damping and of the structural damping.

The hydrodynamic damping is thus defined for each value z, therefore over the total length of the structure.

Step 3:

Calculation of the Response of the Elastic Structure or Pipe

The amplitude response of the elastic pipe subjected to the fluid in motion is split up on the basis of the natural modes ($Y_i$, i=1,N) normalized to 1, according to the formula:

$$A(z) = \sum_{i=1}^{N} A_i Y_i(z)$$

for a given time t and for each point z of the structure, the sum of the vibration amplitudes is determined on all of the excited natural modes. Number N corresponds to the number of natural vibration modes determined during the initial stage.

In order to account for the various forces bearing subscript r and acting on each natural excitation mode bearing subscript i, modal amplitude $A_i$ is split up for a given time t on all the forces as follows:

$$A_i = \sum_{r=1}^{N} A_{ir} \exp(j\omega_r t)$$

r being the subscript corresponding to all the forces ranging between 1 and N, and j is the complex number square root of −1.

The value of vibration amplitude $A_{ir}$ for a mode i and for a force r is $$A_{ir}(t) = \frac{1}{\omega_1 - \omega_2}\left[\int_0^t F_{ir}(\tau)\exp(\omega_1(t-\tau))d\tau - \int_0^t F_{ir}(\tau)\exp(\omega_2(t-\tau))d\tau\right]$$

given by:

where $F_{ir}$ is the amplitude of the force projected on mode i, normalized by modal mass $m_i$, integration over the length of holding zone Lr is performed, $$F_{ir} = \frac{1}{m_i} \int F_r(z)Y_i(z)dz$$

the modal mass is defined as follows:

$$m_i = \int_0^{L_t} m_l Y_i \, dz,$$

with $m_l$ the linear density of the structure and $L_t$ the total length of the structure.

Pulsations $\omega_1$ and $\omega_2$ are defined from the global damping ε which is the sum of the structural damping and of the hydrodynamic damping.

For ε<1, the following formulas apply:

$$\omega_1 = -\varepsilon\omega_r - j(\omega_r + \omega_i\sqrt{1-\varepsilon^2})$$

$$\omega_2 = -\varepsilon\omega_r - j(\omega_r - \omega_i\sqrt{1-\varepsilon^2})$$

For ε>1, the formulas are:

$$\omega_1 = (-\varepsilon + \sqrt{\varepsilon^2-1})\omega_r - j\omega_r$$

$$\omega_2 = (-\varepsilon - \sqrt{\varepsilon^2-1})\omega_r - j\omega_r.$$

This solution implies that, at t=0, the vibration amplitude Ai of the elastic structure is zero.

Numerically, in order not to increase the calculation time by recalculating the integrals from 0 to t, and in order to keep negative arguments in the exponential functions, the integration performed on time variable t is replaced by the following formula in order to obtain the time integrals:

$$\Gamma(t) = \int_0^t F_{ir}(\tau)\exp(\omega_1(t-\tau))d\tau =$$

$$\exp(\omega_1 dt) \times \Gamma(t-dt) + \int_{t-dt}^t F_{ir}(\tau)\exp(\omega_1(t-\tau))d\tau$$

where $\Gamma(t)$ represents the history of force $F_{ir}$ at the time t.

$\Gamma(t)$ is obtained by linear combination of the force history with the time (t−dt) multiplied by a coefficient and the history of the force obtained in increment dt.

At the end of step 3, the value of modal vibration amplitude Ai is known, i.e. the the vibration amplitude for an excitation mode i and a time value t.

Time value t is compared with the maximum time value tmax selected initially.

If t<tmax, the value of t is incremented by value dt, and steps 1 to 3 are repeated, or the results are processed, If t≧tmax, the results are processed.

The maximum amplitude value used in the calculation steps is found as follows:

The values of amplitudes Ai(t−2dt) and Ai(t−dt), that have for example been stored during the previous stages, are known for the times (t−dt) and (t−2dt), if value |Ai(t−dt)| is greater than the two values |Ai(t−2dt)| |Ai(t−2dt)| and |Ai(t)|, maximum value $A_r$ is take as the value of Ai obtained for the time (t−dt) and is stored to be used in the various calculation steps described above.

In the opposite case, maximum value $A_r$ is not changed.

Steps 1 to 3 are for example carried out up to the time value tmax initially selected by the user.

Step 4:

The values obtained in steps 1 to 3 can be used in different ways, some of which are given by way of non limitative example.

Determination of the Drag Coefficient

It is possible to determine, from the amplitude value A(z) obtained at a given time t, by means of formulas given in the prior art, the value of the drag coefficient for a given point or a zone of the structure.

Various formulas allowing obtaining drag coefficient $C_D$ can be used, for example:

Griffin's formula given in the reference book by Griffin, O. M. and S. E. Ramberg, "Some recent studies of vortex shedding with application to marine tubulars and risers", American Society of Mechanical Engineers, Vol. 104, pp.

$$\frac{C_D}{C_{D_o}} = \begin{cases} 1 + \frac{1.16}{(W_r - 1)^{0.65}}, & W_r > 1 \\ 1, & W_r < 1 \end{cases}$$

1–13, 1982:
where $W_r=[(1+2A(t,z)/d)/(V_rSt)]$, or
the formula given by Nedergaard et al., that can be found in the reference book Nedergaard H., N.-E. Ottesen Hansen and Stein Fines, "Response of free hanging tethers", Proceedings of the Seventh International Conference on Behaviour of Offshore Structures, pp. 315–332, 1994:

$$C_D = C_{D_o}\left(1 + 0.97 \frac{A(t, z)}{d}\right).$$

Coefficient $CD_O$ is the vibrationless drag coefficient.
This coefficient is for example used in other calculation softwares for structure calculations. It is thus possible to determine the strains exerted on a structure such as the position of a riser.
It is notably possible to associate this calculation method with the aforementioned Deeplines structure calculation software.
Determination of Stress σ at a Given Point of the Elastic Structure
The concept is to determine the value of the local stress undergone by the structure for example during a given time tmax.
The value of the stress averaged out for all of the natural vibrations modes of the structure and for the value tmax set by the user is preferably calculated.
Stress σ is obtained by means of Navier's formula, for example in reference [1] Frey F., "Analyse des structures et milieux continus", Presses Polytechniques et Universitaires Romandes, 1994:

$$\sigma = -\frac{M}{I}X$$

where X is the value of the distance from an axis of the structure, for example the center of inertia of the elastic structure.
In the case of an elastic cylindrical structure, the center of inertia corresponds to the axis and moment M is given by the formula:

$$M = EIAi(t)\frac{\partial^2 Yi(z)}{\partial z^2}.$$

Quantities E and I are respectively Young's modulus and the moment of inertia, value $Ai(t)$ being the amplitude value determined in stage 3.
It is obtained, for the maximum stress, and by taking for example half the diameter of the cylinder as the value of X:

$$|\sigma_{Mi}(z)| = \frac{Ed}{2}Ai(z)\frac{\partial^2 Yi}{\partial z^2}$$

The total stress at a point z of the structure, resulting from the external disturbance, is obtained by summation on all the modes i.
By summation on the time value up to the time tmax considered to be representative of the influence of the vibrations induced in the structure, the mean value (σi, RMS) of the stress or a maximum stress value σmax(z) for a point z of the structure is obtained. A curve of stress values distributed along the structures is finally obtained.
It is possible to check from these values, for each point z of the structure, if the value of the corresponding stress does not exceed threshold values or allowable values. The allowable values are for example given initially and depend on the elastic structure considered.
When a stress value exceeds an allowable value, it is possible to arrange antivibration systems known to the man skilled in the art at the most critical points of the structure.
Fatigue Determination
This fatigue parameter is interesting because it is an indication in connection with the life of the structure.
Calculation of the fatigue of a structure requires a curve SN which is known, that is a function of the material from which it is made. Two coefficients C and b are determined from this curve, C corresponds to the slope of straight line SN given in a (log, log) diagram and b a point of this line.
By using Miner's hypothesis, given for example in reference book "Rules for Submarine Pipeline Systems", Det Norske Veritas, p.31, December 1996, the fatigue value for a point z is determined as follows:

$$D(z) = \sum_{i=1}^{N} \frac{n_i}{M_i}.$$

By summation on all the natural vibration modes of the structure and with ni the number of cycles over a determined period, for example the number $$n_i = \frac{\omega_i T}{2\pi},$$

of cycles per year.
where T is the number of seconds in a year for example.
The number of cycles up to breakage of the structure is determined from the mean stress value and from coefficients C and b.

$$M_i = C/(\sqrt{2}\sigma_{i,RMS}(z))^b.$$

Figure 2:
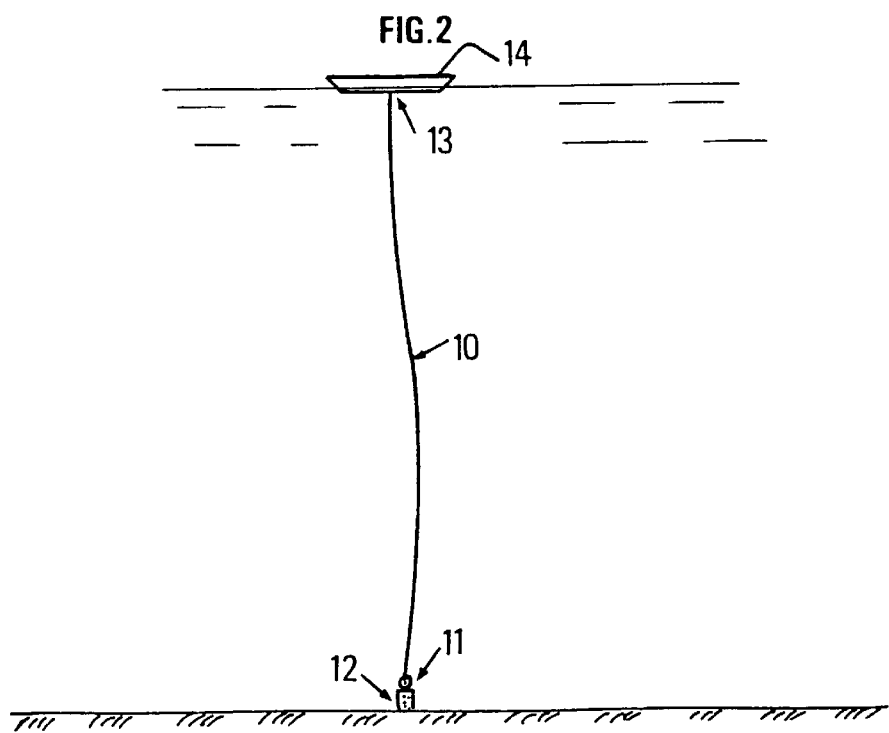
FIG. 2 diagrammatically shows a riser used within the scope of oil production and subjected to the effects of currents and waves.

The life of the structure is obtained from the fatigue value D(z) by means of methods commonly used by the man skilled in the art.
This lifetime is for example compared with a lifetime desired by the user by taking account of a safety margin.
When the life is insufficient in relation to the user's needs, it is possible to modify, for example the outline or the characteristics of the structure, or to associate therewith known antivibration systems.
FIG. 2 diagrammatically shows an example of application of the method described above for determining the mechanical characteristics of a flexible pipe or riser used within the scope of oil production and subjected to the effects of the wave motion, sea currents or any other meteorological phenomenon. By means of these characteristics, it is possible to dimension the riser or to adapt it by associating antivibration systems therewith in cases where the characteristics obtained do not meet the user's requirements.
Riser 10 is fastened by its lower end 11 to a wellhead 12 and by its upper and 13 to a floating support 14 that can be equipped to receive the production coming from the well.
The external disturbance to which the pipe is subjected is shown by a current U(t,z) variable in time and in space, as described before, and diagrammatically shown in FIG. 1.

By setting a sufficient time tmax in order to obtain an image representative of the maximum effects of vibrations induced in the pipe, a curve of the maximum stresses acting along the pipe is for example obtained by implementing the aforementioned steps.

This stress curve is compared with a set of threshold values or allowable values. If one or more stress values exceed the allowable values, the diameter of the pipe is for example adjusted so as to obtain allowable stresses.

Another solution consists in arranging antivibration means around the structure and in the vicinity of points z for which the stress exceeds the allowable values.

The value of the fatigue acting on the pipe can also be obtained by using the stress values as explained above.

This stress value notably allows obtaining the lifetime of the pipe. The user can then compare this lifetime with the set lifetime and modify the structure of the pipe or associate antivibration means therewith if it does not meet the required criteria.

What is claimed is:

1. A method for dimensioning or adapting an elastic structure having a length Lt and immersed in a fluid in motion, comprising:
   a) defining natural excitation modes of the structure;
   b) determining for at least a given time t for an excitation mode of the structure holding zones $L_R$ over the length Lt and, for each holding zone, an excitation force $F_R$ corresponding to an excited natural mode r;
   c) carrying out step b) for all natural modes defined in step a); and
   d) determining a vibration amplitude response A of the elastic structure over a part of the length Lt by accounting for an effect of the excitation forces $F_R$ on each natural vibration mode defined in step a) so as to obtain a characteristic allowing dimensioning or adapting of the structure to mechanical stresses applied by the fluid in motion.

2. A method as claimed in claim 1, wherein:
steps a) to d) are repeated for a given time interval tmax.

3. A method as claimed in claim 2, wherein:
a value of vibration of modal amplitude Ai for an excitation mode i and a time (t−dt) is compared with vibration amplitude values |Ai(t)| and |Ai(t−2dt)| obtained respectively at times (t) and (t−2dt) and when a value |Ai(t−dt)| is greater than the values |Ai(t)| and |Ai(t−2dt)|, the value |Ai(t−2dt)| is used in steps a) to d).

4. A method as claimed in claim 3, comprising:
obtaining a vibration amplitude response A for a point z of the structure by splitting the structure on a basis of natural excitation modes i as follows $$A(z) = \sum_{i=1}^{N} A_i Y_i(z)$$

where N is the number of natural excitation modes; and
a modal amplitude Ai is split for a given time t on all excitation forces, according to the relation $$A_i = \sum_{r=1}^{N} A_{ir} \exp(j\omega_r t)$$

with $A_{ir}$ being a vibration amplitude for a mode i and a force corresponding to subscript r.

5. A method as claimed in claim 4, wherein:
the vibration amplitude $A_{ir}$ is calculated by using Γ(t) which is a history of force $F_{ir}$ at the time (t−dt) and is obtained by linear combination of a history of the force at the time t multiplied by a coefficient and the history of the force obtained from increment dt.

6. A method as claimed in claim 4, wherein:
the vibration amplitude $A_{ir}$ is calculated by splitting a pulsation of mode i and a force corresponding to subscript r.

7. A method as claimed in claim 2, comprising:
obtaining a vibration amplitude response A for a point z of the structure by splitting the structure on a basis of natural excitation modes i as follows:

$$A(z) = \sum_{i=1}^{N} A_i Y_i(z)$$

where N is the number of natural excitation modes; and
a modal amplitude Ai is split for a given time t on all excitation forces, according to the relation $$A_i = \sum_{r=1}^{N} A_{ir} \exp(j\omega_r t)$$

with $A_{ir}$ being a vibration amplitude for a mode i and a force corresponding to subscript r.

8. A method as claimed in claim 7, wherein:
the vibration amplitude $A_{ir}$ is calculated by using Γ(t) which is a history of force $F_{ir}$ at the time (t−dt) and is obtained by linear combination of a history of the force at the time t multiplied by a coefficient and the history of the force obtained from increment dt.

9. A method as claimed in claim 7, wherein:
the vibration amplitude $A_{ir}$ is calculated by splitting a pulsation of mode i and a force corresponding to subscript r.

10. A method as claimed in claim 2, wherein:
at least one maximum stress value σmax(z) corresponding to a point z of the structure is determined at a given time tmax.

11. A method as claimed in claim 10, wherein:
a fatigue value of the structure is determined.

12. A method as claimed in claim 1, wherein:
a value of modal vibration of amplitude Ai for an excitation mode i and a time (t−dt) is compared with vibration amplitude values |Ai(t)| and |Ai(t−2dt)| obtained respectively at times (t) and (t−2dt) and when a value |Ai(t−dt)| is greater than the values |Ai(t)| and |Ai(t−2dt)|, the value |Ai(t−2dt)| is used in steps a) to d).

13. A method as claimed in claim 2, comprising:
obtaining a vibration amplitude response A for a point z of the structure by splitting the structure on a basis of natural excitation modes i as follows $$A(z) = \sum_{i=1}^{N} A_i Y_i(z)$$

where N is the number of natural excitation modes; and
a modal amplitude Ai is split for a given time t on all excitation forces, according to the relation $$A_i = \sum_{r=1}^{N} A_{ir} \exp(j\omega_r t)$$

with $A_{ir}$ being a vibration amplitude for a mode i and a force corresponding to subscript r.

14. A method as claimed in claim 13, wherein:

the vibration amplitude $A_{ir}$ is calculated by using $\Gamma(t)$ which is a history of force $F_{ir}$ at the time (t−dt) and is obtained by linear combination of a history of the force at the time t multiplied by a coefficient and the history of the force obtained from increment dt.

15. A method as claimed in claim 13, wherein:

the vibration amplitude $A_{ir}$ is calculated by splitting a pulsation of mode i and a force corresponding to subscript r.

16. A method as claimed in claim 1, comprising:

obtaining a vibration amplitude response A for a point z of the structure by splitting the structure on a basis of natural excitation modes i as follows $$A(z) = \sum_{i=1}^{N} A_i Y_i(z)$$

where N is the number of natural excitation modes; and a modal amplitude Ai is split for a given time t on all excitation forces, according to the relation $$A_i = \sum_{r=1}^{N} A_{ir} \exp(j\omega_r t)$$

with $A_{ir}$ being a vibration amplitude for a mode i and a force corresponding to subscript r.

17. A method as claimed in claim 16, wherein:

the vibration amplitude $A_{ir}$ is calculated by using $\Gamma(t)$ which is a history of force $F_{ir}$ at the time (t−dt) and is obtained by linear combination of a history of the force at the time t multiplied by a coefficient and the history of the force obtained from increment dt.

18. A method as claimed in claim 16, wherein:

the vibration amplitude $A_{ir}$ is calculated by splitting a pulsation of mode i and a force corresponding to subscript r.

19. A method as claimed in claim 1, wherein:

a drag coefficient of the structure is determined.

20. A method as claimed in claim 1 comprising:

dimensioning or adapting a pipe used in oil production to mechanical stresses applied by wave motion or sea currents.

21. A method as claimed in claim 20 comprising:

determining at least one of a drag coefficient of the pipe, stresses induced in the pipe and fatigue of the pipe.

\* \* \* \* \*